J. DRUMB.
BUMPER FOR AUTOMOBILES.
APPLICATION FILED SEPT. 18, 1920.
1,377,814.
Patented May 10, 1921.
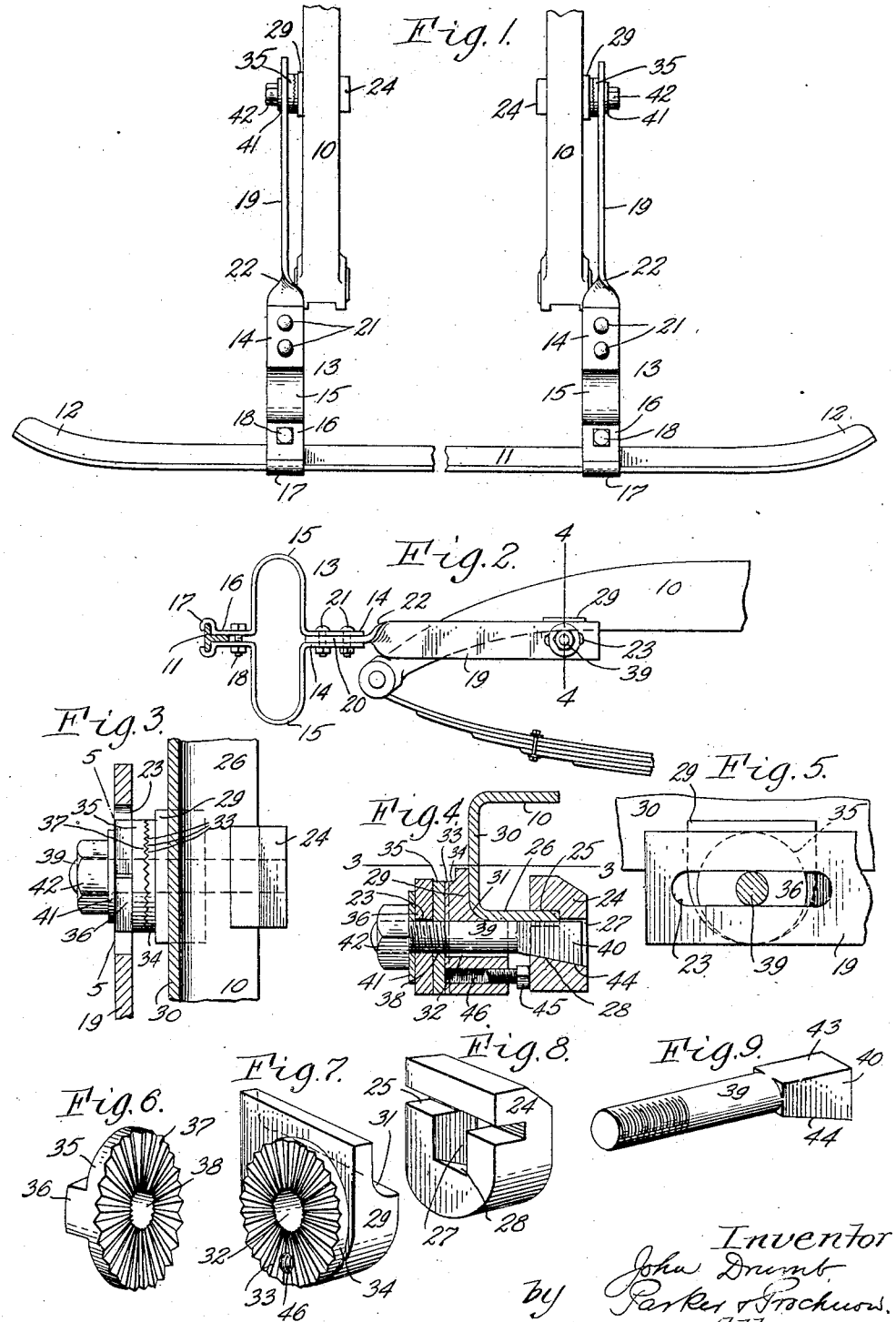

UNITED STATES PATENT OFFICE.

JOHN DRUMB, OF BUFFALO, NEW YORK, ASSIGNOR TO McKINNON DASH COMPANY, OF BUFFALO, NEW YORK.

BUMPER FOR AUTOMOBILES.

1,377,814.        Specification of Letters Patent.     Patented May 10, 1921.

Application filed September 18, 1920. Serial No. 411,195.

*To all whom it may concern:*

Be it known that I, JOHN DRUMB, a citizen of the United States, residing at Buffalo, in the county of Erie and State of New York, have invented a new and useful Improvement in Bumpers for Automobiles, of which the following is a specification.

This invention relates to automobile bumpers.

One of the objects of the present invention is to provide a bumper readily adaptable for connection with vehicles having frames of various widths. Other objects are to provide improved means for adjusting the elevation of the bumper; also to improve bumper constructions whereby a more resilient bumper action is obtained. Further objects are to provide improved means for connecting the bumper to the frame of a vehicle and to improve automobile bumper structures in other respects hereinafter described and set forth in the claims.

In the accompanying drawings:

Figure 1 is a fragmentary plan view of a portion of a vehicle frame and a bumper constructed according to the invention.

Fig. 2 is a sectional elevation thereof.

Fig. 3 is a horizontal section thereof on line 3—3, Fig. 4.

Fig. 4 is a section thereof on line 4—4, Fig. 2.

Fig. 5 is a sectional elevation thereof, on line 5—5, Fig. 3.

Figs. 6, 7, 8 and 9 are perspectives of the respective parts of the attaching means thereof.

The invention, briefly stated, contemplates improvements in bumper structure generally and improvements in attaching means for readily connecting the bumper to vehicles of the type having frames including longitudinal channel beams.

Referring to the drawings:

10 designates the usual longitudinal, inwardly-opening, frame channels of an automobile. According to the invention there is provided a bumper bar 11, which is preferably rigid and of T section. As is usual, the ends 12 of the bar 11 may be bent inwardly if desired. The bumper bar is preferably arranged with its flat face in position to receive any blows or shocks to which the bumper may be subjected. The bar 11 is supported and held by resilient, spring members 13, each comprising a pair of duplicate spring strips comprising attaching portions 14, bowed or arched spring leaf portions 15, preferably substantially of U-shape and horizontal bar clamp portions 16, which terminate in flanged ends 17. As illustrated, these spring strips are associated in pairs connected by a bolt 18, clamping the horizontal portion of the spring strip against the leg of the T bar, and the flanged ends 17 thus securely grip the edges of the T head. The spring members are each connected to an attaching arm 19, which is preferably formed with a shank 20 fitted between attaching portions 14 of the spring member and held in place by bolts 21. In order to provide greater rigidity the arm is preferably bent as at 22. The attaching arm 19 is provided, preferably adjacent to its free end with a slot 23. Only one slot is illustrated in the embodiment disclosed but it is obvious that any suitable number of slots may be provided, whereby the distance the bumper projects from the vehicle may be varied.

The means for attaching the bumper to the vehicle frame comprise a clamping member 24 provided with a longitudinal slot 25 whereby the clamping member may be seated upon the edge of a flange 26 of the frame member 10. The member 24 is also provided with a recess or aperture 27, preferably communicating with the slot 25 and formed with an inclined or cam inner face 28. Coöperating with the clamping member 24 is a second clamping member 29 adapted to contact with and bear upon the web portion 30 of the channel 10. The inner edge of the member 29 is preferably recessed as at 31, whereby the member 29 may be seated upon a portion of the web 30 and adjacent portion of the side flange 26. The clamping member 29 has an aperture 32 therethrough and is provided on its outer face with a plurality of corrugations or teeth 33. It is preferred that these corrugations or teeth be formed on the relatively raised, annular head or boss 34 and extend radially from the edge of the aperture 32 therethrough. An angularly adjustable holding part 35 having an elongated lug or key 36 which fits into the slot 23 of the arm 19 and which has an inner corrugated or toothed face 37 surrounding a hole 38, is provided for contact with and adjustment relative to the member 29. The corrugated or toothed face 37 of the part 35 coöperates and engages with the corrugations or teeth 33 on the part 29 and its teeth are of suitable size and pitch for this purpose. The clamping parts hereinabove described are held together by a bolt 39 provided with a head 40 adapted to seat in the recess 27 of the clamping member 24. The shank of the bolt extends through holes 32 and 38 of the second clamping member 29 and the adjustable holding part 35, and carries at its outer end a suitable washer 41 and nut 42. To best serve the purposes of this invention, the bolt head 40 is preferably formed with a flat side 43 and an oppositely disposed flaring or inclined side 44 so that when the parts are assembled a portion of the bolt shank and the flat side 43 of the head will contact with the side flange 26 of the channel and the inclined side 44 of the bolt head will coöperate with the inclined surface 28 of the recess to wedge the member 24 tightly upon the flange 26. The bolt 39 is preferably of sufficient length to permit use of the clamping parts on frame channels having flanges of different widths and the slot 25 is preferably of sufficient width so that the parts may be readily fitted to channel flanges of different thicknesses, the bolt by reason of its flaring head which slides on the inclined surface 28 of the recessed part being capable of sufficient lateral movement to quickly and firmly wedge a metal flange of any suitable thickness.

To obtain a most efficient and secure clamping action of the parts, it is necessary that the movable clamping members 24 and 29 be maintained substantially parallel to each other. This may be accomplished by providing one of the movable members with a spacing member adapted to bear against the other movable member. As disclosed in the embodiment of the invention illustrated, the spacing member may be a machine bolt or screw 45 projecting from the inner face of the member 29 and adjustable in a threaded hole 46 therein. The machine bolt projects more or less from the inner face of the member 29 and is adjustable to project to different distances from the face, thereby readily adapting the clamping members to channel beams having flanges of different sizes.

The bumper described is readily adapted to vehicles wherein the distances between the longitudinal frame member differ as the arms 19 may be separately attached to the frame members and then the bumper bar 11 inserted between the flanges 17 and the horizontal portions 16, which may be fitted to any portion of the bumper bar. Bolts 18 are then put in place to secure the bar 11 in the support. It will be seen that a most effective spring resistance is furnished by the strong and rigid T bar acting on the oppositely looped springs 13 and that the desired elevation of the bumper bar relatively to the frame channel 10 may be readily secured by adjusting the part 35 angularly on the clamping member 29. This adjustment, by reason of the described connection of the lug 36 with the slot 23 of the arm 19 will permit the arm to swing on the bolt 39 into the desired position relative to the clamping member 29, which is held in fixed relation to the channel 10 by means of the recess 31 and bolt 39. The attaching means for the bumper are simple and compact in construction, a single bolt sufficing to hold the clamping means on the frame channel to adjust the elevation of the bumper, and to secure the bumper to the attaching means.

I claim as my invention:

1. In an automobile bumper, the combination of a bumper bar, and spring supporting means for said bar including a pair of spring members having oppositely disposed looped portions, the ends of said spring members being adapted to grip said bar, and means for attaching said spring supporting means to a vehicle.

2. In an automobile bumper, the combination of a bumper bar of T section having its flat face arranged to receive impacts to which the bumper is subjected, of a pair of spring members having oppositely disposed looped portions and secured to said bar, and means for securing said spring members to a vehicle.

3. In an automobile bumper, the combination of a bumper bar, and spring supporting means for said bar includnig a pair of spring members having oppositely disposed and vertically extending looped portions, and means for attaching said spring supporting means to a vehicle.

4. In an automobile bumper, the combination of a bumper bar of T section, a pair of oppositely disposed spring parts, each of said parts having a looped portion and a portion extending therefrom and having parts adapted to be clamped into gripping engagement with said bar.

5. In an automobile bumper, the combination of a bumper bar of T section, a pair of oppositely disposed and duplicate spring parts, each of said parts having a loop portion and a portion extending therefrom across the shank of said T bar and terminating in a flanged end gripping one of the edges of the head of said T bar.

6. In a bumper for vehicles, in combination with a channel frame of a vehicle, a clamping member having a slot for receiving a part of a channel flange, a recess in said member and communicating with said slot, said recess providing a bolt head retaining seat, a second member having a part bearing on the web of said channel and provided with an aperture therethrough, a bolt having a head seated in the recess in said first clamping member and extending through the aperture in said second member, a bumper, supporting means for said bumper, and means coöperating with said bolt and said second member for retaining said bumper connected to said second member.

7. In combination with a channel frame member of a vehicle, a clamping member for engaging the edge of one of the flanges of said channel, a second clamping member for engaging the web of said channel member in parallel relation to said first clamping member, means for moving one of said clamping members relative to the other for clamping said channel and whereby said clamping member may be secured to channels having flanges of different width, and adjustable means for maintaining said clamping members in parallel relation when they are clamped.

8. In a bumper for attachment to a vehicle having channel frame members, the combination of a clamping member having a slot therein for seating on a flange of one of said frame channels, said clamping member having a recess therein, a bolt having a head fitting in said recess and bearing upon said side flange, said bolt extending outwardly beneath and beyond said channel flange, a second clamping member on the projecting end of said bolt and having a part bearing upon the web of said channel, an angularly adjustable bumper securing part on said second member, and means for securing said angularly adjustable part in position on said second member and for securing said members to said channel.

9. In a bumper for attachment to a vehicle having channel frame members, the combination of a clamping member having a slot therein for seating on a flange of one of said frame channels, said clamping member having a recess therein, a bolt having a head fitting in said recess and bearing upon said side flange, said bolt extending outwardly beneath and beyond said channel flange, a second clamping member on the projecting end of said bolt and having a recessed portion adapted to contact with a portion of the web and of the side flange of said channel, said second member having an aperture therethrough, a toothed face on said second member, an angularly adjustable member having a toothed inner face adapted to contact with the toothed face of said second member, a lug on the outer face of said adjustable member, and a bumper supporting arm having a slotted portion adapted to fit over said lug.

10. In a bumper for attachment to channel frame members of a vehicle, the combination of a clamping member having a slot therein for fitting over the edge of a flange of one of said channel frame members, a recess in said clamping member and communicating with said slot, said recess being formed with an inclined face, a second clamping member having a seat formed therein to contact with said channel, said second clamping member having a hole therethrough and provided with a threaded aperture, an adjustable distance member in said aperture and contacting with said first clamping member, and a bolt having a head seated in said recess in the first clamping member and extending through the hole in said second clamping member.

11. In a bumper for attachment to channel frame members of a vehicle, the combination of a clamping member having a slot therein for fitting over the edge of a flange of one of said channel frame members, a recess in said clamping member and communicating with said slot, said recess being formed with an inclined face, a bolt having a head seated in said recess, said bolt being movable lengthwise in said clamping member, and said bolt being movable laterally during movement of said bolt head lengthwise on the inclined face of said recess, whereby a portion of the bolt head coöperates with the slotted portion of said clamping member to retain the clamping member on the channel flange.

12. In combination with a frame channel, an attaching member comprising two parts one movable relatively to the other, one of said parts having a portion contacting with a side of a flange of said channel, and the other part contacting with the other side of said flange and coöperating inclined faces on said two parts whereby movement of said parts relatively to each other causes said parts to be wedged tightly against opposite sides of said channel flange.

13. The combination with a bumper adapted to be attached to a vehicle frame member having a flange, of a clamp for securing said bumper to said frame member and including a member having a part engaging one side of said flange of the frame member and a part extending to the other side thereof, and a taper headed bolt arranged in said other side of the flange and adapted to coöperate with said clamp member to wedge the head of said bolt between said other side of said flange and said clamp member.

14. The combination with a bumper adapted to be attached to a vehicle frame member having a flange, of a clamp for securing said bumper to said frame member and including a member straddling a flange of said channel and engaging one side of said flange, and a bolt having a wedge shaped head and adapted to coöperate with said member to wedge said head between member and said flange, whereby said member is drawn into engagement with one side of said flange and said head is drawn into engagement with the other side of said flange.

15. The combination with a bumper adapted to be attached to a vehicle frame member having a flange, of a clamp for securing said bumper to said frame member and including a member straddling a flange of said channel and engaging one side of said flange, and a bolt having a wedge shaped head and adapted to coöperate with said member to wedge said head between said member and said flange, whereby said member is drawn into engagement with one side of said flange and said head is drawn into engagement with the other side of said flange, and means for coöperating with said bolt for connecting said bumper with said clamp.

16. A clamp adapted to seat on the side channel of a vehicle frame, said clamp comprising a member having a portion seating on and surrounding a part of a flange of the channel, a second member bearing on said channel and having a part for holding the arm of a bumper, and means connecting said first and second named members, said means coöperating with said first mentioned member for wedging said means and said first mentioned member into engagement with the flange of said channel.

17. A clamp adapted to seat on the side channel of a vehicle frame, said clamp comprising a member having a portion seating on and surrounding a part of a flange of the channel, a second member bearing on said channel and having a part for holding the arm of a bumper, and means having a seating in said first member and extending through said second member for holding said bumper arm on said second member, for pressing said member against said channel, and for wedging a portion of said flange edge in said first member.

18. In a bumper for attachment to a vehicle having channel frame members, the combination of a clamping member having a slot therein for seating on a flange of one of said frame channels, said clamping member having a recess therein, a bolt having a head fitting in said recess and bearing upon said side flange, said bolt extending outwardly beneath and beyond said channel flange, a second clamping member on the projecting end of said bolt and having a recessed portion adapted to contact with a portion of the web and of the side flange of said channel, said second member having an aperture therethrough, a toothed face on said second member, an adjustable arm securing member on the projecting end of said bolt, said arm securing member having a toothed inner face, a lug on the outer face of said arm securing member, a bumper supporting arm, said arm having a slotted portion for receiving said lug, and a nut on the end of said bolt for holding said arm on said arm securing member and said clamping member on said frame channel.

Witness my hand this 17th day of September, 1920.

JOHN DRUMB.

Witnesses:
W. D. NOTMAN,
WALLACE CORMACK.